(12) United States Patent
Tseng et al.

(10) Patent No.: US 9,726,943 B2
(45) Date of Patent: Aug. 8, 2017

(54) DISPLAY PANEL COMPRISING A COMMON ELECTRODE HAVING FIRST AND SECOND MAIN SLITS THAT CORRESPOND WITH FIRST AND SECOND LIGHT SHIELDING PORTIONS, RESPECTIVELY

(71) Applicant: AU Optronics Corporation, Hsin-chu (TW)

(72) Inventors: Wen-Hsien Tseng, Hsin-chu (TW); Chia-Hui Pai, Hsin-chu (TW); Hsin-Ju Wu, Hsin-chu (TW); Yh-Hung Lee, Hsin-chu (TW); You-Yuan Hu, Hsin-chu (TW); Teng-Yi Wang, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/131,172

(22) Filed: Apr. 18, 2016

(65) Prior Publication Data

US 2017/0176817 A1    Jun. 22, 2017

(30) Foreign Application Priority Data

Dec. 17, 2015   (TW) .............................. 104142418 A

(51) Int. Cl.
| | | |
|---|---|---|
| *G02F 1/1343* | (2006.01) | |
| *G02F 1/1362* | (2006.01) | |
| *G02F 1/1335* | (2006.01) | |
| *G02F 1/1368* | (2006.01) | |
| *G02F 1/1339* | (2006.01) | |
| *G02F 1/1333* | (2006.01) | |

(52) U.S. Cl.
CPC ...... *G02F 1/134309* (2013.01); *G02F 1/1368* (2013.01); *G02F 1/13394* (2013.01); *G02F 1/133345* (2013.01); *G02F 1/133512* (2013.01); *G02F 1/133514* (2013.01); *G02F 1/136213* (2013.01); *G02F 1/136286* (2013.01); *G02F 2001/134318* (2013.01)

(58) Field of Classification Search
CPC .......................................... G02F 2001/134318
See application file for complete search history.

(56) References Cited

U.S. PATENT DOCUMENTS

| | | |
|---|---|---|
| 7,605,896 B2 | 10/2009 | Su |
| 7,804,571 B2 | 9/2010 | Lu et al. |
| 2013/0083264 A1 | 4/2013 | Hagiwara et al. |

(Continued)

*Primary Examiner* — Paul Lee
(74) *Attorney, Agent, or Firm* — McClure, Qualey & Rodack, LLP

(57) ABSTRACT

A display panel including a first substrate, scan lines, data lines, active devices, color filter patterns, pixel electrodes and a light shielding pattern disposed on the first substrate, a second substrate disposed opposite to the first substrate, a liquid crystal layer disposed between the second substrate and the pixel electrodes and a common electrode disposed on the second substrate is provided. The light shielding pattern is located between two adjacent color filter patterns to shield a gap between the two adjacent color filter patterns. The common electrode has common electrode patterns and a main slit. The common electrode patterns are disposed correspondingly to the pixel electrodes. The main slit is disposed correspondingly to the light shielding pattern.

15 Claims, 14 Drawing Sheets

(56) References Cited

U.S. PATENT DOCUMENTS

2013/0335664 A1* 12/2013 Shim .................... G02F 1/1339
                                                              349/43
2014/0078454 A1    3/2014 Kim
2014/0132901 A1*   5/2014 Kim ................ G02F 1/133753
                                                             349/129
2015/0049289 A1*   2/2015 Jang ................ G02F 1/133707
                                                             349/142

* cited by examiner

DISPLAY PANEL COMPRISING A COMMON ELECTRODE HAVING FIRST AND SECOND MAIN SLITS THAT CORRESPOND WITH FIRST AND SECOND LIGHT SHIELDING PORTIONS, RESPECTIVELY

BACKGROUND

The present application claims priority to Taiwan patent application number 104142418 filed Dec. 17, 2015, the contents of which are incorporated herein by reference.

Technical Field

The present invention relates to a photoelectric apparatus, and particularly, to a display panel.

Related Art

A conventional display panel includes a pixel array substrate, a color filter substrate, and a liquid crystal layer sandwiched between the pixel array substrate and the color filter substrate. The pixel array substrate includes pixel electrodes. The color filter substrate includes color filter patterns and light shielding patterns (also known as black matrix) shielding gaps between the color filter patterns. Under an ideal assembly condition, the color filter patterns of the color filter substrate are aligned with the pixel electrodes of the pixel array substrate, and the light shielding patterns of the color filter substrate may shield gaps between the pixel electrodes, to prevent occurrence of light leak or color mixture.

However, with increases of the resolution of display panels, the requirement for assembly precision is increased accordingly, and it becomes more difficult to assemble the color filter substrate and the pixel array substrate. To improve or address the alignment problem, the color filter patterns and the light shielding patterns are directly made on the pixel array substrate to form structures known as color filter on array (COA) and Black matrix on Array (BOA). This improves the alignment problem among the color filter patterns, the light shielding patterns, and the pixel electrodes. However, when the light shielding patterns are directly made on the pixel array substrate, the light shielding patterns may often induce liquid crystal molecules to dump toward improper directions thereby causing a disclination line problem near edges of the pixel electrodes, which is not conducive to enhancing the penetration rate of the display panel.

SUMMARY

The present invention provides a display panel, which has good optical characteristics.

The display panel of the present invention includes a first substrate, scan lines, data lines, active devices, color filter patterns, pixel electrodes, a light shielding pattern, a second substrate, a liquid crystal layer and a common electrode. The scan lines and the data lines are disposed on the first substrate. The scan lines and the data lines are crossed, to define pixel areas on the first substrate. The active devices are located on the first substrate and electrically connected with the scan lines and the data lines. The color filtering patterns are disposed on the pixel areas and are separated from each other. The pixel electrodes are disposed on the color filter patterns and electrically connected with the active devices. The light shielding pattern is located between two adjacent color filter patterns to shield a gap between the two adjacent color filter patterns. The second substrate is disposed opposite to the first substrate. The liquid crystal layer is disposed between the second substrate and the pixel electrodes. The common electrode is disposed on the second substrate and located between the second substrate and the liquid crystal layer. The common electrode has common electrode patterns and a main slit. The common electrode patterns are disposed correspondingly to the pixel electrodes. The main slit is disposed correspondingly to the light shielding pattern.

In an embodiment of the present invention, the width of the main slit is greater than or equal to that of the light shielding pattern.

In an embodiment of the present invention, the light shielding pattern surrounds the pixel electrodes.

In an embodiment of the present invention, the light shielding pattern includes first light shielding portions and second light shielding portions. The first light shielding portions are disposed on the scan lines. The second light shielding portions intersect with the first light shielding portions, and are disposed along an extending direction of the data lines. The main slit of the common electrode includes first main slits and second main slits. The first main slits are disposed correspondingly to the first light shielding portions, and the first main slits and the first light shielding portions at least partially overlap in a vertical projection direction. The second main slits intersect with the first main slits and are disposed correspondingly to the second light shielding portions. The second main slits and the second light shielding portions at least partially overlap in a vertical projection direction.

In an embodiment of the present invention, each of the first main slits has a width $Ws1$ in the extending direction of the data lines, a first light shielding portion corresponding to the first main slit has a width $Wb1$ in the extending direction of the data lines, and $Ws1 \geq Wb1$; each of the second main slits has a width $Ws2$ in an extending direction of the scan lines, a second light shielding portion corresponding to the second main slit has a width $Wb2$ in the extending direction of the scan lines, and $Ws2 \geq Wb2$.

In an embodiment of the present invention, each of the pixel electrodes includes a trunk portion and branch portions. The trunk portion divides the pixel area where it is into regions. The branch portions are electrically connected with the trunk portion and located within the regions. Each of the common electrode patterns has a first minor slit. The first minor slit exposes the corresponding trunk portion.

In an embodiment of the present invention, the trunk portion of the pixel electrode and the first minor slit are disposed along an extending direction of the data lines and at least partially overlap in a vertical projection direction.

In an embodiment of the present invention, the trunk portion of the pixel electrode and the first minor slit are disposed along an extending direction of the scan lines and at least partially overlap in a vertical projection direction.

In an embodiment of the present invention, the trunk portion of the pixel electrode includes a first trunk portion and a second trunk portion. The first trunk portion is parallel to the scan lines. The second trunk portion is electrically connected with the first trunk portion and parallel to the data lines. The common electrode pattern covers the branch portions, and the first minor slit exposes the first trunk portion and the second trunk portion corresponding thereto.

In an embodiment of the present invention, each of the common electrode patterns has second minor slits, and the second minor slits expose the branch portions.

In an embodiment of the present invention, the display panel further includes spacers. The spacers are disposed on the first substrate and abut against the second substrate, wherein the spacers and the light shielding pattern are made of the same material.

In an embodiment of the present invention, the pixel electrodes include a first pixel electrode and a second pixel electrode adjacent to each other. The active devices include a first active device electrically connected with the first pixel electrode and a second active device electrically connected with the second pixel electrode. The display panel further includes a first common electrode line, a second common electrode line and a shared switch device. The first pixel electrode overlaps with the first common electrode line, to be electrically coupled into a first storage capacitor. The second common electrode line overlaps with the second common electrode line, to be electrically coupled into a second storage capacitor. The second active device has a source electrically connected with the data lines, a gate electrically connected with the scan lines and a drain electrically connected with the second pixel electrode. The shared switch device has a source, a gate electrically connected with another scan line and a drain. The source of the shared switch device is electrically connected with the drain of the second active device. The drain of the shared switch device overlaps with the first common electrode line, to be electrically coupled into a shared capacitor.

In an embodiment of the present invention, the display panel further includes a first insulating layer. The first insulating layer covers the scan lines, the data lines and the active devices. The color filter patterns are disposed on the first insulating layer.

In an embodiment of the present invention, the display panel further includes a second insulating layer. The second insulating layer covers the color filter patterns. The pixel electrodes and the light shielding pattern are disposed on the second insulating layer.

A display panel according to an embodiment of the present invention includes a pixel array substrate, an opposite substrate disposed opposite to the pixel array substrate and a liquid crystal layer located between the pixel array substrate and the opposite substrate. The pixel array substrate is a structure of COA and BOA having a color filter pattern and a light shielding pattern. In particular, the common electrode of the opposite substrate has a main slit disposed correspondingly to the light shielding pattern of the pixel array substrate. Through the setting of the main slit, at least some regions directly above the light shielding pattern have no common electrode. Accordingly, when the display panel is enabled (that is, when the pixel electrode and the common electrode have a drive voltage therebetween), liquid crystal molecules directly above and near the light shielding pattern are prone to dumping towards a specified direction, and it is not easy to cause a disclination line problem, so that the penetration rate of the display panel can be enhanced.

To enable the foregoing features and advantages of the present invention more comprehensible, a detailed description is made as follows through embodiments in combination with the accompanying drawings.

DETAILED DESCRIPTION

Figure 1:
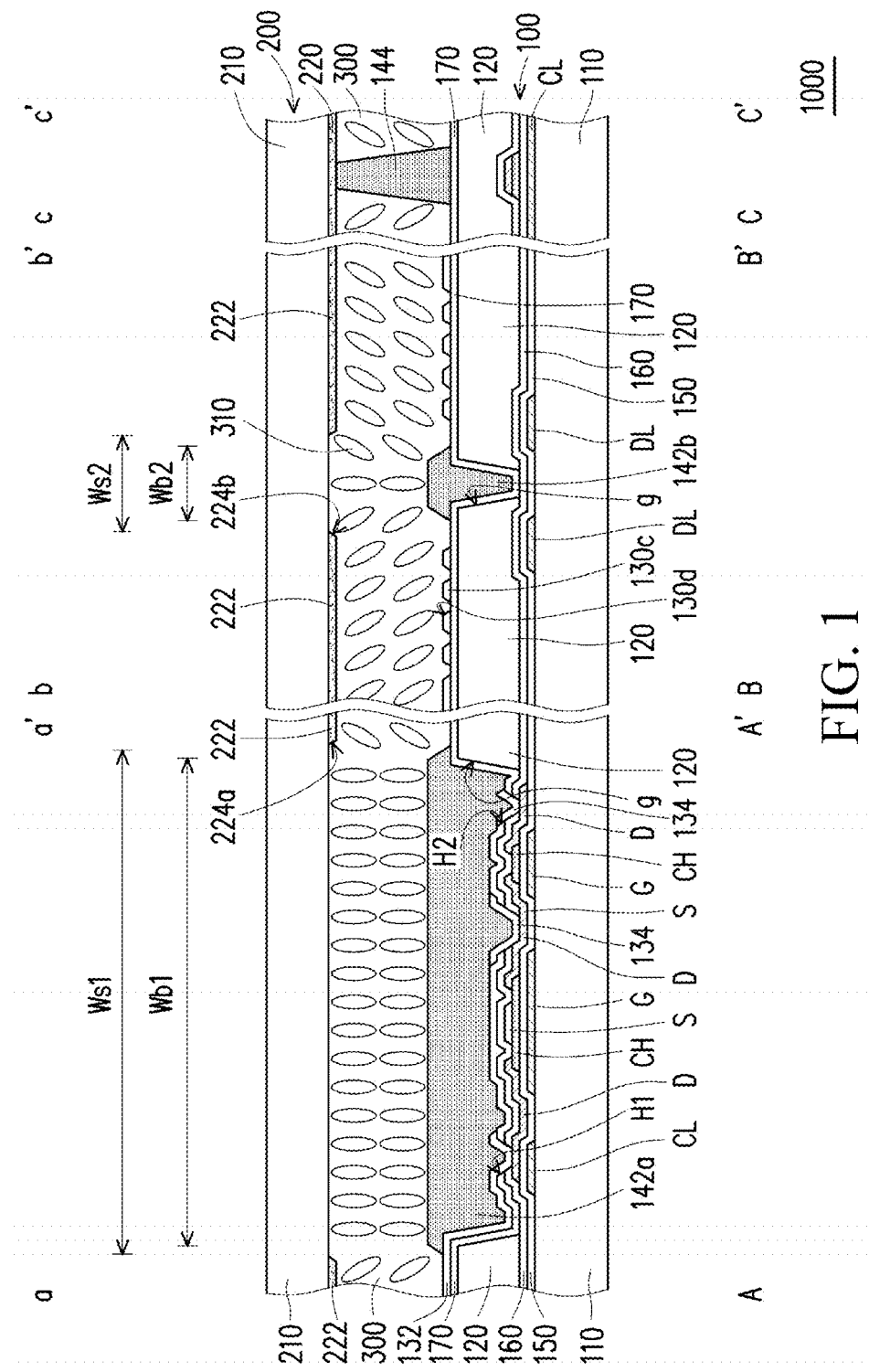
FIG. 1 is a schematic sectional diagram of a display panel 1000 according to an embodiment of the present invention.
Figure 2:
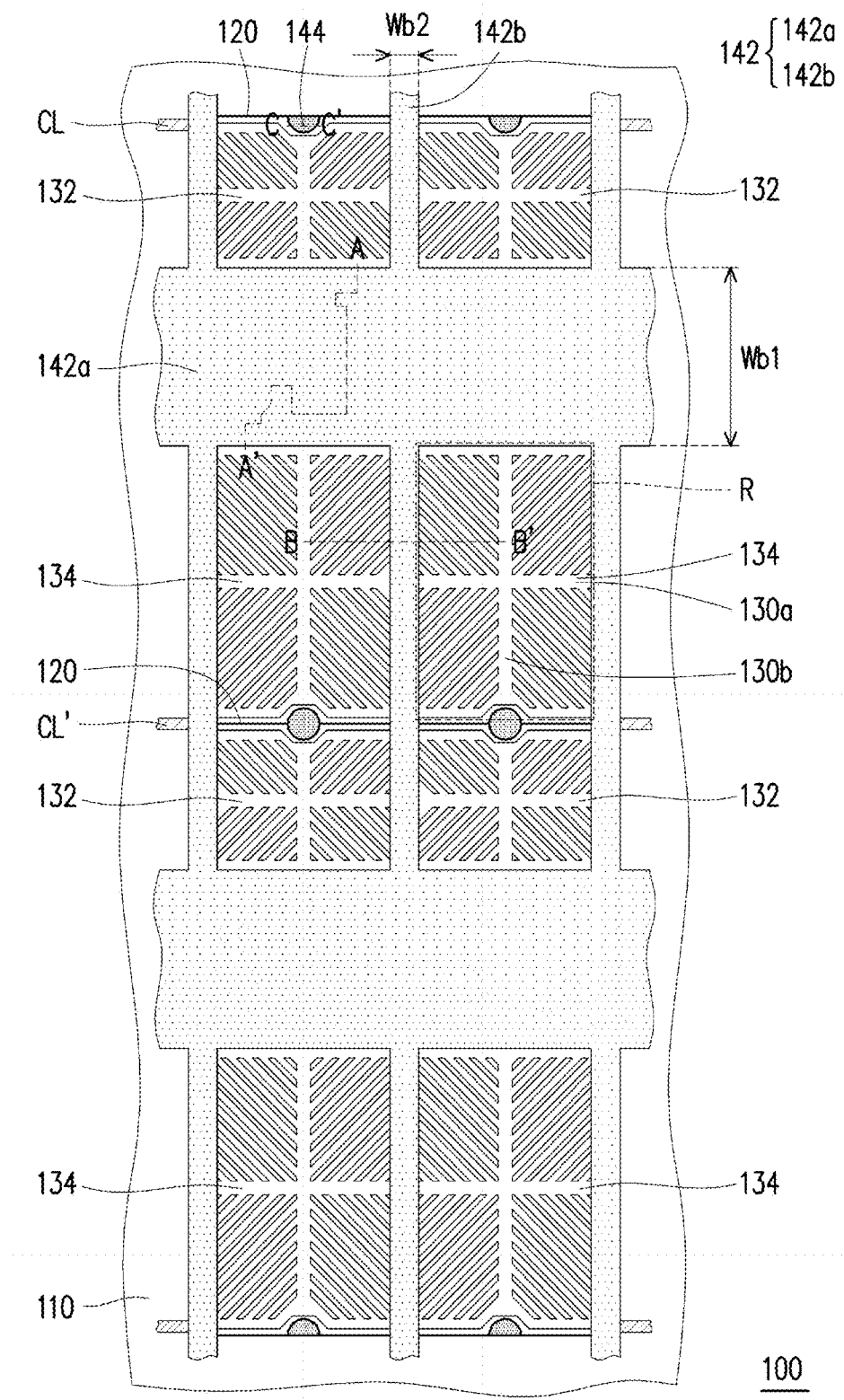
FIG. 2 is a top schematic diagram of a pixel array substrate 100 of the display panel 1000 of FIG. 1.
Figure 3:
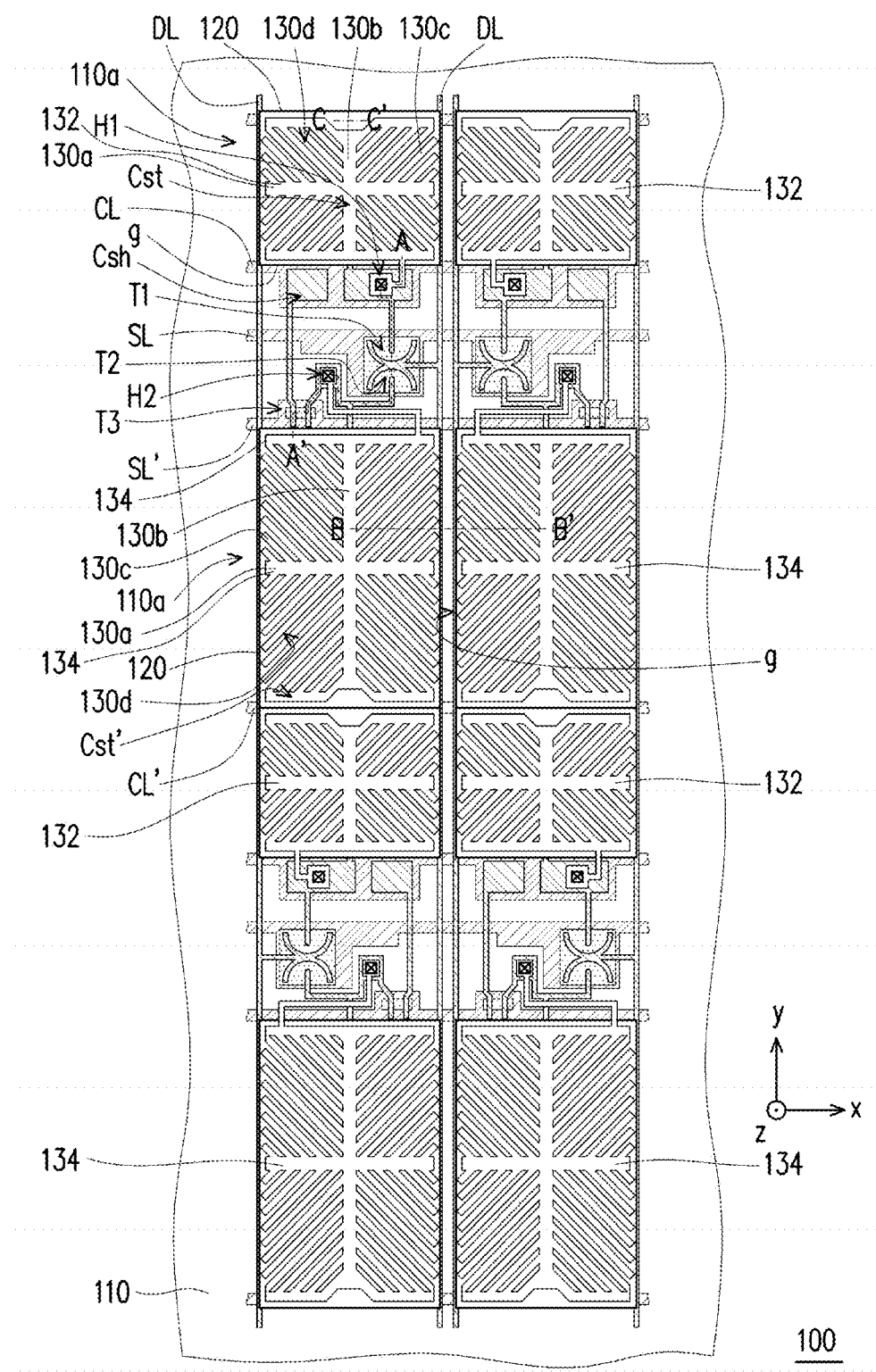
FIG. 3 is a top schematic diagram of the pixel array substrate 100 where the light shielding pattern 142 and the spacers 144 of FIG. 2 are omitted.
Figure 4:
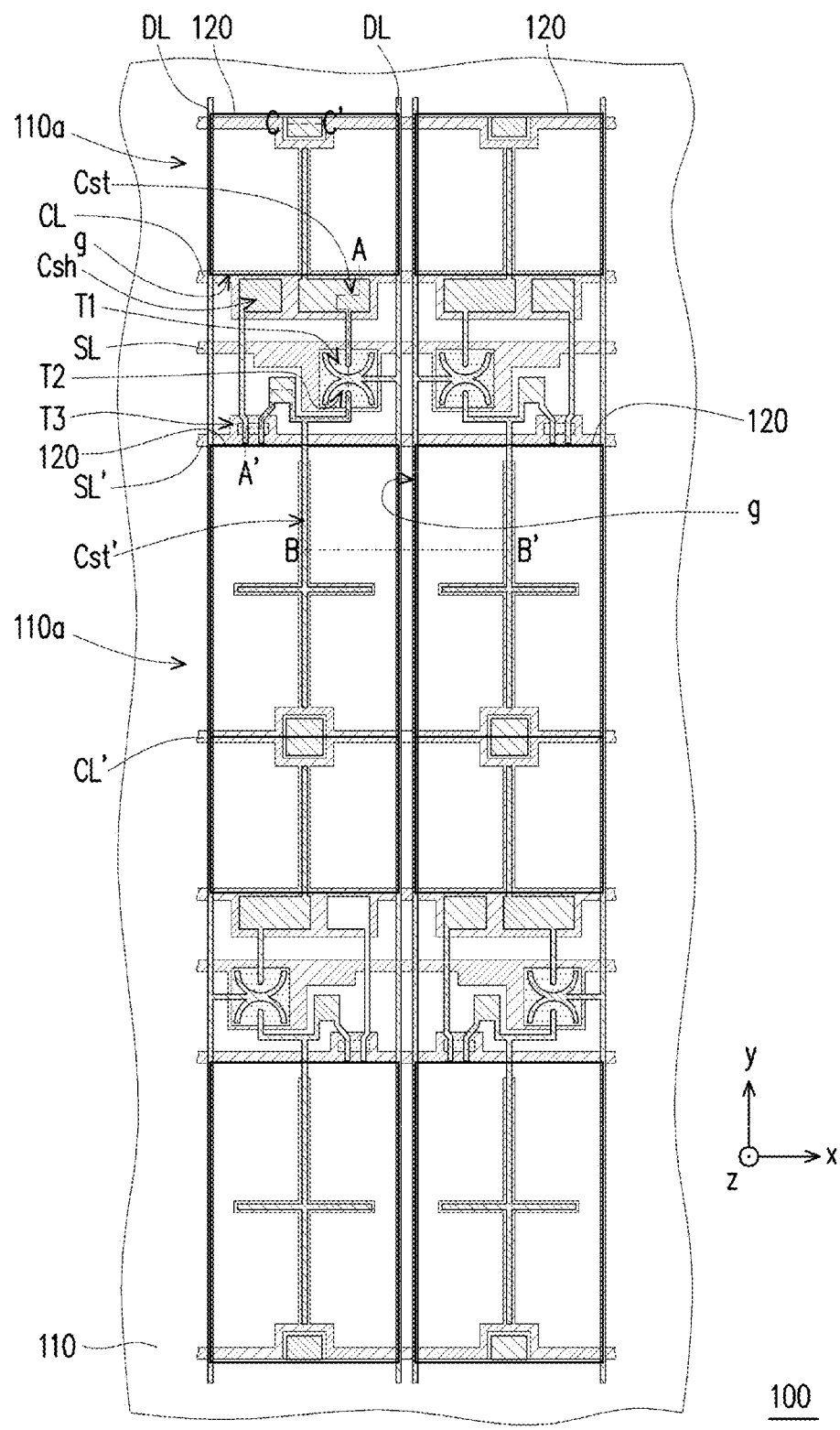
FIG. 4 is a top schematic diagram of the pixel array substrate 100 where the pixel electrodes 132 and 134 of FIG. 3 are omitted.

FIG. 1 is a schematic sectional diagram of a display panel 1000 according to an embodiment of the present invention. FIG. 2 is a top schematic diagram of a pixel array substrate 100 of the display panel 1000 of FIG. 1. For the sake of clear expression, FIG. 3 and FIG. 4 are drawn. FIG. 3 is a top schematic diagram of the pixel array substrate 100 where the light shielding pattern 142 and the spacers 144 of FIG. 2 are omitted. FIG. 4 is a top schematic diagram of the pixel array substrate 100 where the pixel electrodes 132 and 134 of FIG. 3 are omitted. In particular, FIG. 1 corresponds to profiles A-A', B-B' and C-C' of FIG. 2, FIG. 3 and FIG. 4.

Referring to FIG. 1, the display panel 1000 includes a pixel array substrate 100, an opposite substrate 200 disposed opposite to the pixel array substrate 100 and a liquid crystal layer 300. The liquid crystal layer 300 is sandwiched between pixel electrodes 132 and 134 of the pixel array substrate 100 and a common electrode 220 of the opposite substrate 200. Referring to FIG. 1 and FIG. 3, the pixel array substrate 100 includes a first substrate 110, scan lines SL and SL', data lines DL, active devices T1 and T2 and pixel electrodes 132 and 134. Referring to FIG. 1, FIG. 2 and FIG. 3, the pixel array substrate 100 further includes color filter patterns 120 (marked in FIG. 2 and FIG. 3) and a light shielding pattern 142 (drawn in FIG. 2). In other words, the pixel array substrate 100 may be a structure of COA and BOA. In this embodiment, the first substrate 110 may be a light-transmitting substrate, and the light-transmitting substrate, for example, is made of glass, quartz, an organic polymer or other applicable materials. However, the present invention is not limited thereto, in other embodiments, the first substrate 110 may also be a light-proof/reflection substrate which may be made of a conductive material, a wafer, ceramic or other applicable materials, but the present invention is not limited thereto.

Referring to FIG. 1 and FIG. 3, the scan lines SL and SL' and the data lines DL are located on the first substrate 110. The scan lines SL and SL' and the data lines DL belong to different films. The scan lines SL and SL' and the data lines DL are crossed, to define pixel areas 110*a* on the first substrate 110. An extending direction x of the scan lines SL and SL' is not parallel to an extending direction y of the data lines DL. For example, in this embodiment, the extending direction x of the scan lines SL and SL' may be perpendicular to an extending direction y of the data lines DL, but the present invention is not limited thereto. Based on the consideration of electroconductibility, the scan lines SL and SL' and the data lines DL are generally made of metal materials. However, the present invention is not limited thereto, and according to other embodiments, he scan lines SL and SL' and the data lines DL may also be made of other conductive materials, for example, nitrides of alloy and metal materials, oxides of metal materials, nitrogen oxides of metal materials, or stacked layers of metal materials and other conductive materials.

Active devices T1 and T2 are located on the first substrate 110 and are electrically connected with the scan lines SL (which may also be referred to as first scan lines SL) and the data lines DL. In detail, each of the active devices T1 and T2 has a gate G, a channel CH, a source S and a drain D. The gate G is electrically connected with the scan lines SL. The source S is electrically connected with the data lines DL. The drains D of the active devices T1 and T2 are electrically connected with the pixel electrodes 132 and 134 respectively. As shown in FIG. 1, in this embodiment, the channel CH is located above the gate G. The source S and the drain D are located above the channel CH. In other words, bottom gate TFTs are an example of the active devices T1 and T2, but the present invention is not limited thereto, and according to other embodiments, the active devices T1 and T2 may also be top gate TFTs or other appropriate TFTs. In addition, the pixel array substrate 100 further includes insulating layers 150 and 160 (marked in FIG. 1). The insulating layer 150 (also referred to as gate insulating layer) sandwiched between the channel CH and the gate G. The insulating layer 160 (also referred to as protective layer) covers the active devices T1 and T2, the scan lines SL and SL' and the data lines DL. The insulating layers 150 and 160 may be made of an inorganic material (for example, silicon oxide, silicon nitride, silicon oxynitiide or a stacked layer of at least two materials), organic materials or a combination thereof.

Referring to FIG. 3, in this embodiment, two adjacent active devices T1 and T2 are selectively electrically connected to the same scan line SL and the same data line DL in other words, the pixel array substrate 100 of this embodiment may be an architecture of 1D1G, wherein "D" refers to the data line and "G" refers to the scan line. However, the present invention is not limited thereto, and those of ordinary skill in the art can modify the pixel array substrate 100 as an architecture of 2D1G, an architecture of 2D2G, an architecture of half source driving (HSD) or other appropriate architectures according to the spirit of the present invention. The pixel array substrate having the architecture and the display panel including the pixel array substrate are also within the protection scope of the present invention.

Referring to FIG. 1, FIG. 3 and FIG. 4, color filter patterns 120 are disposed in the pixel areas 110*a*. In detail, as shown in FIG. 1, in this embodiment, the color filter patterns 120 may also be disposed on the insulating layer 160. Referring to FIG. 3 and FIG. 4, the color filter patterns 120 are separated from each other. The color filter patterns 120 have gaps g therebetween. The active devices T1 and T2 are located in the gaps g. The pixel array substrate 100 further includes an insulating layer 170 (drawn in FIG. 1). The insulating layer 170 covers the color filter patterns 120 and fills in the gaps g, to cover the insulating layer 160 above the active devices T1 and T2. The insulating layer 170 may be made of an inorganic material (for example, silicon oxide, silicon nitride, silicon oxynitride or a stacked layer of at least two materials), organic materials or a combination thereof.

Referring to FIG. 1, FIG. 3 and FIG. 4, the pixel electrodes 132 and 134 are disposed on the color filter patterns 120 respectively and electrically connected with the active devices T1 and T2 respectively. In detail, as shown in FIG. 1 and FIG. 3, in this embodiment, the pixel electrodes 132 and 134 extend from above the color filter patterns 120 to the gaps g between the color filter patterns 120 respectively and then fill in through holes H1 and H2 of the insulating layers 160 and 170 respectively, to be electrically connected with the drains D of the active devices T1 and T2 respectively. In this embodiment, the pixel electrodes 132 and 134 may be transparent conductive layers, and the transparent conductive layers are made of metal oxides, for example, ITOs, IZOs, Al—Sn oxides, Al—Zn oxides, In—Ge—Zn oxides, or other appropriate oxides, or stacked layers of at least two of the above, but the present invention is not limited thereto.

Referring to FIG. 3, in this embodiment, each pixel electrode 132 (134) includes trunk portions 130*a* and 130*b* and branch portions 130*c*. The pixel area 110*a* where the trunk portions 130*a* and 130*b* are located is divided into regions (domains) (e.g., first to fourth quadrants). The branch portions 130*c* are electrically connected with the trunk portions 130*a* and 130*b* and located in the regions. An alignment slit 130*d* is disposed between two adjacent branch portions 130*c*. The pixel electrodes 132 and 134 include a first trunk portion 130*a* and a second trunk portion 130*b* interacting and electrically connected with each other. In this embodiment, the first trunk portion 130*a* is selectively parallel to the scan line SL, and the second trunk portion 130*b* is selectively parallel to the data line DL. However, the present invention is not limited thereto, and in other embodiments, the first trunk portion 130*a* and the second trunk portion 130*b* may not be parallel to the scan lines SL and the data lines DL respectively. In addition, the present invention is not limited, so as to require that each pixel electrode 132 (and 134) has to simultaneously include the first trunk portion 130*a* and the second trunk portion 130*b*; in other words, the present invention does not limit that each pixel area 110*a* has to be divided into four regions (e.g., first to fourth quadrants). In other embodiments, each pixel electrode 132 (and 134) may also selectively include the first trunk portion 130*a* or the second trunk portion 130*b*, and each pixel area 110*a* may also be divided into two regions (e.g., a first quadrant and a second quadrant, a third quadrant and a fourth quadrant, a first quadrant and a fourth quadrant, or a second quadrant and a third quadrant).

Referring to FIG. 3 and FIG. 4, in this embodiment, the pixel array substrate 100 may further include common electrode lines CL and CL'. As shown in FIG. 1 and FIG. 3, the common electrode line CL overlaps with the pixel electrode 132, to be electrically coupled into a storage capacitor Cst. As shown in FIG. 3, the common electrode line CL' overlaps with the pixel electrode 134, to be electrically coupled into a storage capacitor Cst'. In this embodiment, the common electrode lines CL and CL', the scan lines SL and SL' and the gate G may belong to the same film, but the present invention is not limited thereto.

Referring to FIG. 1 and FIG. 3, the pixel array substrate 100 may further selectively include a shared switch device T3 The shared switch device T3 has a gate G, a channel CH, a source S and a drain D. The gate G of the shared switch device T3 is electrically connected with the scan line SL' (which may also be referred to as second scan line SL'). The source S of the shared switch device T3 is electrically connected with the drain of the active device T2. The drain D of the shared switch device T3 overlaps with the common electrode line CL, to be electrically coupled into a shared capacitor Csh. Referring to FIG. 3, when the display panel 1000 is driven, it is feasible to first input a scan signal to the scan line SL, at this point, the active devices T1 and T2 are turned on, and the pixel electrodes 132 and 134 can receive the same drive signal from the data line DL, then make the storage capacitors Cst and Cst' store specified charges. Next, the scan signal is input to the scan line SL', and at this point, the shared switch device T3 is turned on while the active devices T1 and T2 are turned off. As the source S of the shared switch device T3 is electrically connected with the pixel electrode 134, when the shared switch device T3 is turned on, the charges originally stored in the storage capacitor Cst' are scattered to the shared capacitor Csh, to make two regions respectively corresponding to the pixel electrode 132 and the pixel electrode 134 present different brightness, thereby improving the problem of color washout. However, the present invention is not limited thereto, and in other embodiments, the design of the scan line SL', the shared switch device T3 and the shared capacitor Csh may not be adopted.

Referring to FIG. 1, FIG. 2 and FIG. 3, the light shielding pattern 142 is disposed on the insulating layer 170 and part of the pixel electrodes 132 and 134. The light shielding pattern 142 is located between two adjacent color filter patterns 120, to shield the gap g between the two adjacent color filter patterns 120. In this embodiment, the light shielding pattern 142 is disposed on at least one side of each of the pixel electrodes 132 and 134. The light shielding pattern 142 includes first light shielding portions 142a and second light shielding portions 142b. The first light shielding portions 142a are disposed above the scan line SL. The first light shielding portions 142a may shield the gaps g between two adjacent rows of the color filter patterns 120. The second light shielding portions 142b intersect with the first light shielding portions 142a and are disposed along the extending direction y of the data lines DL. The second light shielding portions 142b may shield the gaps g between two adjacent columns of the color filter patterns 120. In other words, the light shielding pattern 142 may surround each of the pixel electrodes 132 and 134. Furthermore, in this embodiment, each of the second light shielding portions 142b may shield two adjacent data lines DL, but the present invention is not limited thereto.

Referring to FIG. 1 and FIG. 2, the display panel 1000 further includes spacers 144. The spacers 144 are disposed on the first substrate 110 and abut against the second substrate 210. In this embodiment, the light shielding pattern 142 and the spacers 144 can be patterned at the same time by using a half tone photomask, and the spacers 144 and the light shielding pattern 142 may be made of the same material. However, the present invention is not limited thereto, and in other embodiments, the spacers 144 and the light shielding pattern 142 may be formed respectively but may be made of different materials. In this embodiment, the spacers 144 may also be a ball spacer disposed through spraying or injecting to be randomly scattered on the first substrate 110 or the second substrate 210.

Figure 5:
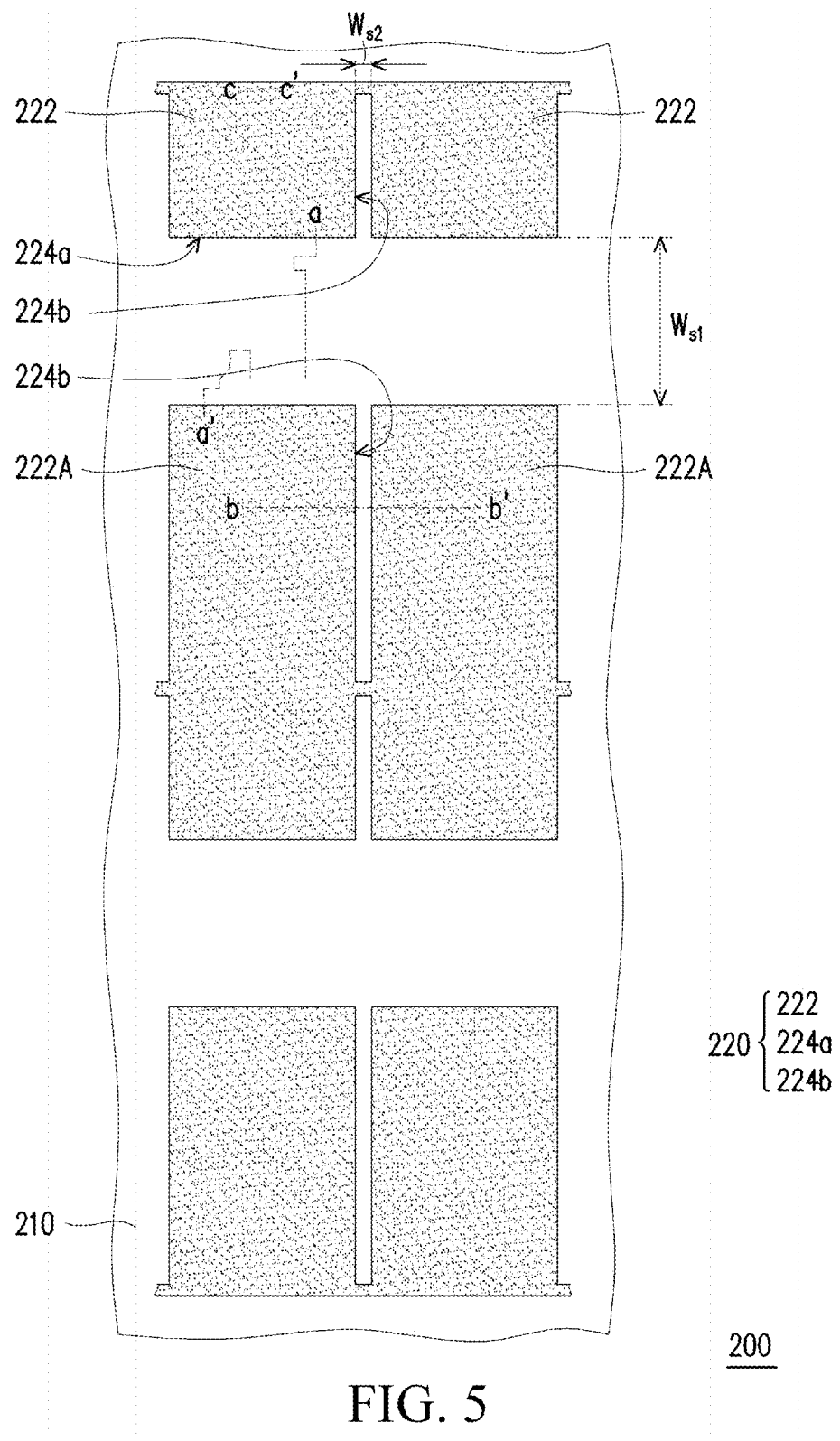
FIG. 5 is a top schematic diagram of an opposite substrate 200 of the display panel 1000 of FIG. 1.

FIG. 5 is a top schematic diagram of an opposite substrate 200 of the display panel 1000 of FIG. 1. In particular, FIG. 1 corresponds to profiles a-a', b-b' and c-c' of FIG. 5. Referring to FIG. 1 and FIG. 5, the opposite substrate 200 includes a second substrate 210 and a common electrode 220. The second substrate 210 is disposed opposite to the first substrate 110. The common electrode 220 is disposed on the second substrate 210 and located between the second substrate 210 and the liquid crystal layer 300. The common electrode 200 has common electrode patterns 222 electrically connected with each other. The common electrode patterns 222 are disposed correspondingly to the pixel electrodes 132 and 134. In other words, each common electrode pattern 222 overlaps with the corresponding pixel electrode 132 (or 134) in a vertical projection direction z (marked in FIG. 3). The common electrode 220 may be a transparent conductive layer, and the transparent conductive layer is made of metal oxides, for example, ITOs, IZOs, Al—Sn oxides, Al—Zn oxides, In—Ge—Zn oxides, or other appropriate oxides, or a stacked layer of at least two of the above, but the present invention is not limited thereto.

The common electrode 220 further has main slits 224a and 224b that define the common electrode patterns 222. Referring to FIG. 1, FIG. 2 and FIG. 5, in particular, the main slits 224a and 224b are disposed corresponding to the light shielding pattern 142 (that is to say, the main slits 224a and 224b overlap with the light shielding pattern 142 in the vertical projection direction z). Through the setting of the main slits 224a and 224b, at least some regions directly above the light shielding pattern 142 do not have the common electrode 220. Accordingly, liquid crystal molecules 310 directly above and near the light shielding pattern 142 are prone to dumping along the alignment slit 130d towards a specified direction, and the situation of a disclination line (or referred to as dark line) caused by discontinuous directions of the liquid crystal molecules in the prior art is not easy to occur, so that the penetration rate of the display panel 1000 can be enhanced.

Figure 6:
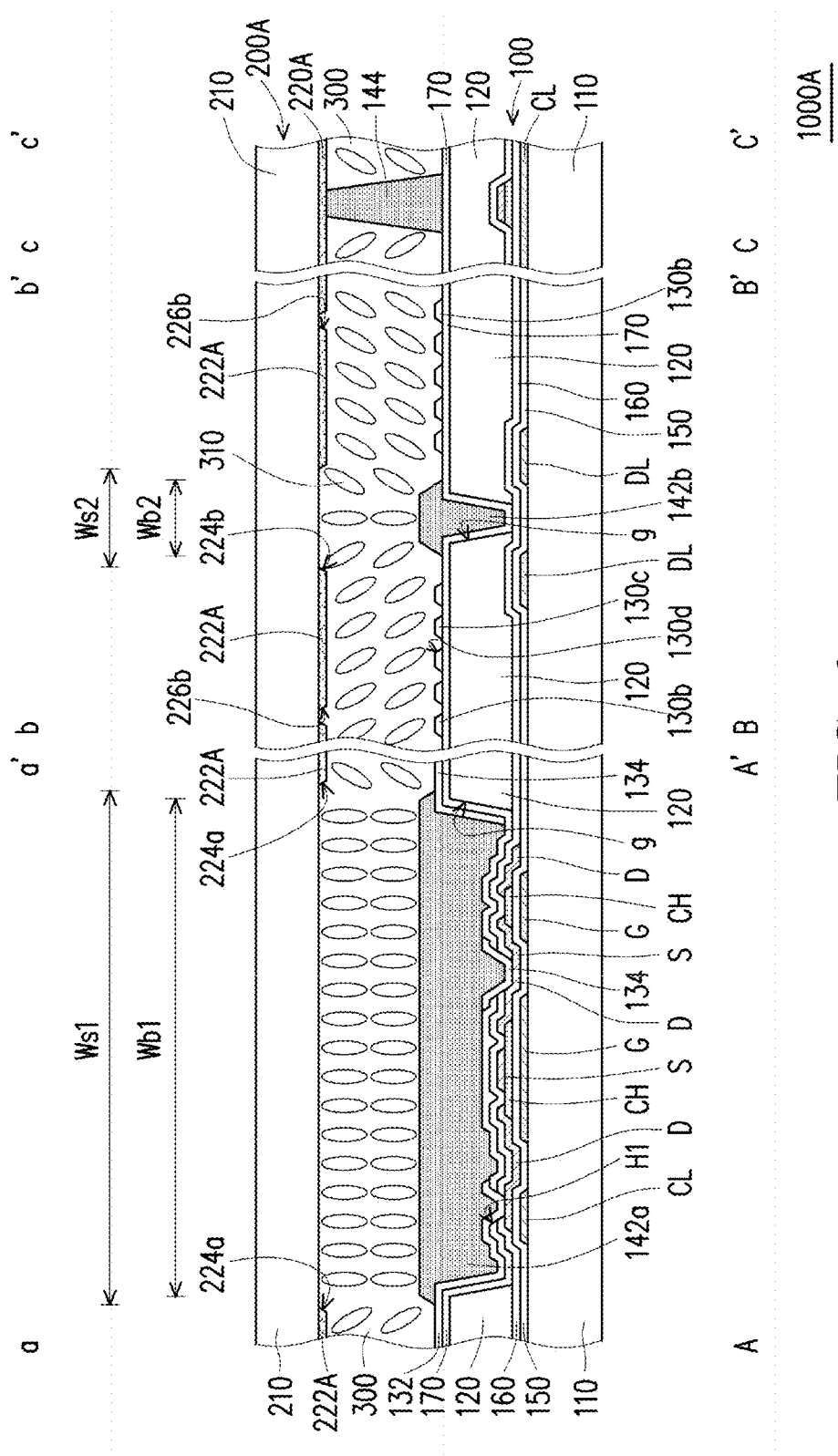
FIG. 6 is a schematic sectional diagram of another display panel 1000A according to an embodiment of the present invention.

Referring to FIG. 1, FIG. 2 and FIG. 5, furthermore, in this embodiment, the width of the main slits 224a and 224b may be greater than or equal to the width of the light shielding pattern 142. If the width of the main slits 224a and 224b is greater than or equal to the width of the light shielding pattern 142, the liquid crystal molecules 310 directly above and near the light shielding pattern 142 are not easier to swing to conflicts to generate a disclination line, so that the penetration rate of the display panel 1000 can be further enhanced. For example, in this embodiment, the main slits 224a and 224b of the common electrode 220 include first main slits 224a and second main slits 224b intersecting with each other. The first main slits 224a are disposed correspondingly to the first light shielding portions 142a. The first main slits 224a and the first light shielding portions 142a at least partially overlap in the vertical projection direction z. The second main slits 224b are disposed correspondingly to the second light shielding portions 142b. The second main slits 224b and the second light shielding portions 142b at least partially overlap in the vertical projection direction z. Each first main slit 224a has a width Ws1 in the extending direction y of the data lines DL. The first light shielding portion 142a corresponding to the first main slit 224a has a width Wb1 in the extending direction y of the data lines DL. Each second main slit 224b has a width Ws2 in the extending direction x of the scan lines SL. The second light shielding portion 142h corresponding to the second main slit 224b has a width Wb2 in the extending direction x of the scan lines SL. In this embodiment, Ws1≥Wb1 (referred to Formula 1), and Ws2≥Wb2 (referred to Formula 2). It should be noted that the present invention is not limited to simultaneously meeting the Formula 1 and the Formula 2, and the penetration rate of any display panel 1000 meeting any one of the Formula 1 and the Formula 2 can be further enhanced, which also falls within the protection scope of the present invention. In addition, due to the tolerance on the process, widths Ws1, Wb1, Ws2 and Wb2 of the first main slit 224a, the first light shielding portion 142h, the second main slit 224b and the second light shielding portion 142h may be not the same, and the widths Ws1, Wb1, Ws2 and Wb2 may be regarded as average values of the widths of the first main slit 224a, the first light shielding portion 142h, the second main slit 224b and the second light shielding portion 142b. FIG. 6 is a schematic sectional diagram of another display panel 1000A according to an embodiment of the present invention. The pixel array substrate 100 of the display panel 1000A is the same as the pixel array substrate 100 of the display panel 1000; therefore, reference can be made to the related description about FIG. 2, FIG. 3 and FIG. 4 for the description about the pixel array substrate 100 of the display panel 1000A, which are not repeated herein. The display panel 1000A is similar to the display panel 1000, and thus the same or corresponding device is represented with the same or corresponding reference sign. The difference between the display panel 1000A and the display panel 1000 is that the common electrodes 220 of the opposite substrate 200 and 200A are different. The difference is mainly described below, and reference can be made to the foregoing description for the similarity between them, which is not repeated herein.

Figure 7:
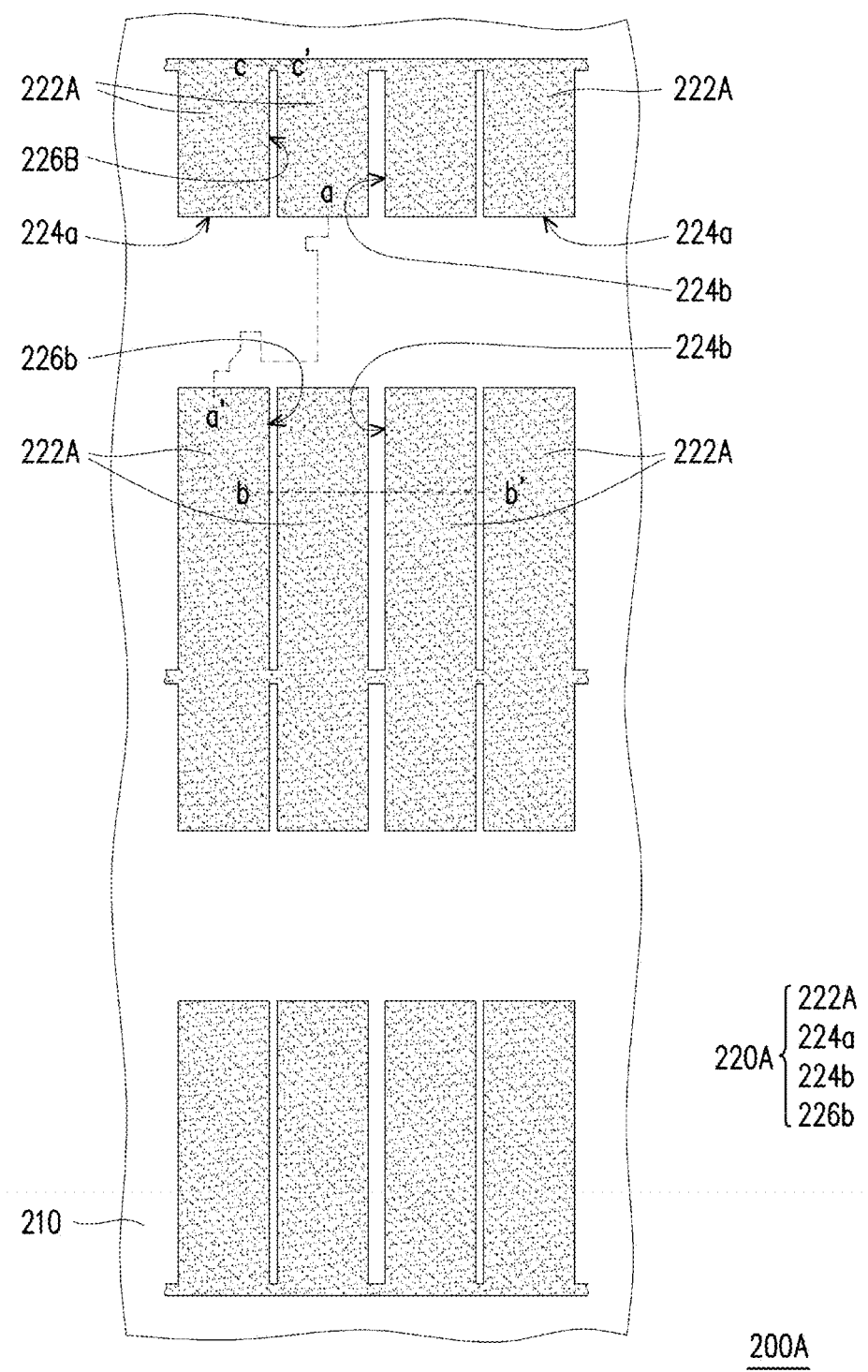
FIG. 7 is a top schematic diagram of an opposite substrate 200A of the display panel 1000A of FIG. 6.

Referring to FIG. 6, the display panel 1000A includes a pixel array substrate 100, an opposite substrate 200A disposed opposite to the pixel array substrate 100 and a liquid crystal layer 300. The liquid crystal layer 300 is sandwiched between pixel electrodes 132 and 134 of the pixel array substrate 100 and a common electrode 220 of the opposite substrate 200A. FIG. 7 is a top schematic diagram of an opposite substrate 200A of the display panel 1000A of FIG. 6. In particular, FIG. 6 corresponds to profiles a-a', b-b' and c-c' of FIG. 7. Referring to FIG. 6 and FIG. 7, the opposite substrate 200A includes a second substrate 210 and a common electrode 220A. The second substrate 210 is disposed opposite to the first substrate 110. The common electrode 220A is disposed on the second substrate 210 and located between the second substrate 210 and the liquid crystal layer 300. The common electrode 220A has common electrode patterns 222A electrically connected with each other and main slits 224a and 224b that define the common electrode patterns 222A. The main slits 224a and 224b are disposed correspondingly to the light shielding pattern 142.

The common electrode patterns 222A of the display panel 1000A are different from the common electrode patterns 222 of the display panel 1000. In detail, the common electrode patterns 222A have a minor slit 226b exposing the trunk portion 130b and cover the trunk portion 130a, the branch portions 130c and the alignment slit 130d, unlike the common electrode patterns 222 of the display panel 1000 which cover the whole pixel electrodes 132 and 134. In this embodiment, the trunk portion 130b of the pixel electrode 132 (and 134) and the minor slit 226b may be selectively disposed along the extending direction y of the data lines DL. The trunk portion 130b of the pixel electrode 132 (and 134) and the minor slit 226b may at least partially overlap in a vertical projection direction z, but the present invention is not limited thereto.

Figure 9:
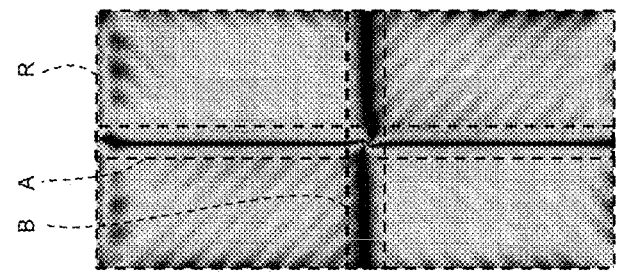
FIG. 9 shows an image corresponding to the region R of FIG. 2 when the display panel 1000A is enabled.
Figure 8:
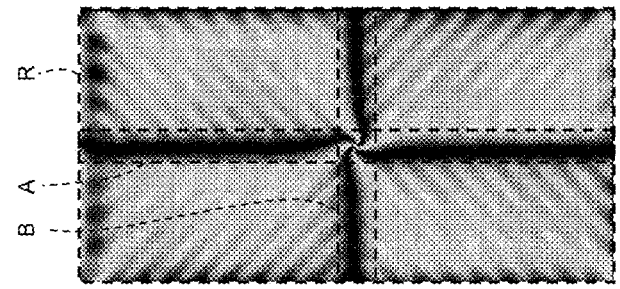
FIG. 8 shows an image corresponding to the region R of FIG. 2 when the display panel 1000 is enabled.

Through the setting of the minor slit 226b, the penetration rate of the display panel 1000A may be further enhanced compared with the display panel 1000, for example, is enhanced 6.57%, which is proved below through FIG. 8 and FIG. 9. For the convenience of comparison, FIG. 8, FIG. 9, FIG. 12 and FIG. 15 are simultaneously drawn on the last page of the figures. Referring to FIG. 8 and FIG. 9, FIG. 8 shows an image corresponding to the region R of FIG. 2 when the display panel 1000 is enabled, and FIG. 9 shows an image corresponding to the region R of FIG. 2 when the display panel 1000A is enabled. It can be known by comparing FIG. 8 and FIG. 9 that in the same area A corresponding to the trunk portion 130b of FIG. 2, the area A of FIG. 9 is more likely to be an illuminated state. The reason is that, in the embodiment of FIG. 8 (i.e., display panel 1000), a common electrode pattern 222 is present directly above the trunk portion 130b; therefore, when the display panel 1000 is enabled (i.e., when the pixel electrode 132 or 134 and the common electrode pattern 222 have a drive voltage therebetween), an optical axis of the liquid crystal molecules 310 directly above the trunk portion 130b may substantially dump towards left and right sides of the centerline of the trunk portion 130b, but the dumping direction is not consistent with the extending direction of the alignment slit 130d of the pixel electrode 132 or 134, and regions directly above the corresponding trunk portion 130b are almost in a dark state; on the other hand, in the embodiment of FIG. 9 (i.e., display panel 1000A), a first minor slit 226b is disposed directly above the trunk portion 130b (i.e., at least some regions directly above the trunk portion 130b are not provided with common electrode patterns 222); therefore, when the display panel 1000 is enabled (i.e., when the pixel electrode 132 or 134 and the common electrode pattern 222A have a drive voltage therebetween), an optical axis of the liquid crystal molecules 310 directly above the trunk portion 130b may substantially dump towards left and right sides of the centerline of the trunk portion 130b, but the dumping direction of the optical axis of most liquid crystal molecules 310 is not consistent with the extending direction of the alignment slit 130d of the pixel electrode 132 or 134, making some regions directly above the trunk portion 130b in an illuminated state, to enhance the penetration rate of the display panel 1000A.

Figure 10:
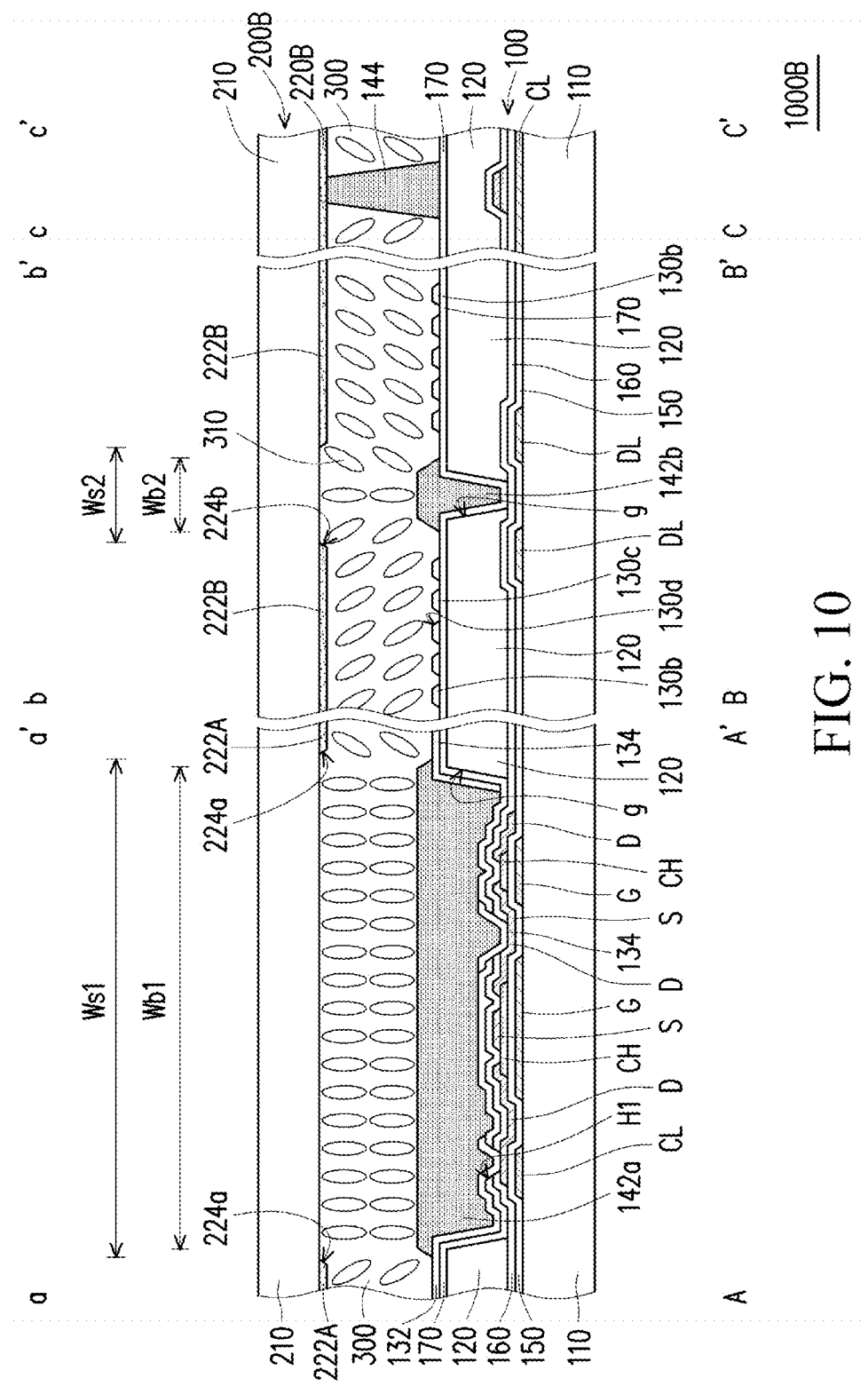
FIG. 10 is a schematic sectional diagram of another display panel 1000B according to an embodiment of the present invention.

FIG. 10 is a schematic sectional diagram of another display panel 1000B according to an embodiment of the present invention. The pixel array substrate 100 of the display panel 1000B is the same as the pixel array substrate 100 of the display panel 1000; therefore, reference can be made to the related description about FIG. 2, FIG. 3 and FIG. 4 for the description about the pixel array substrate 100 of the display panel 1000B, which are not repeated herein. The display panel 1000B is similar to the display panel 1000, and thus the same or corresponding device is represented with the same or corresponding reference sign. The difference between the display panel 1000B and the display panel 1000 is that the common electrodes 220 of the opposite substrate 200 and 220B of the opposite substrate 200B are different. The difference is mainly described below, and reference can be made to the foregoing description for the similarity between them, which is not repeated herein.

Figure 11:
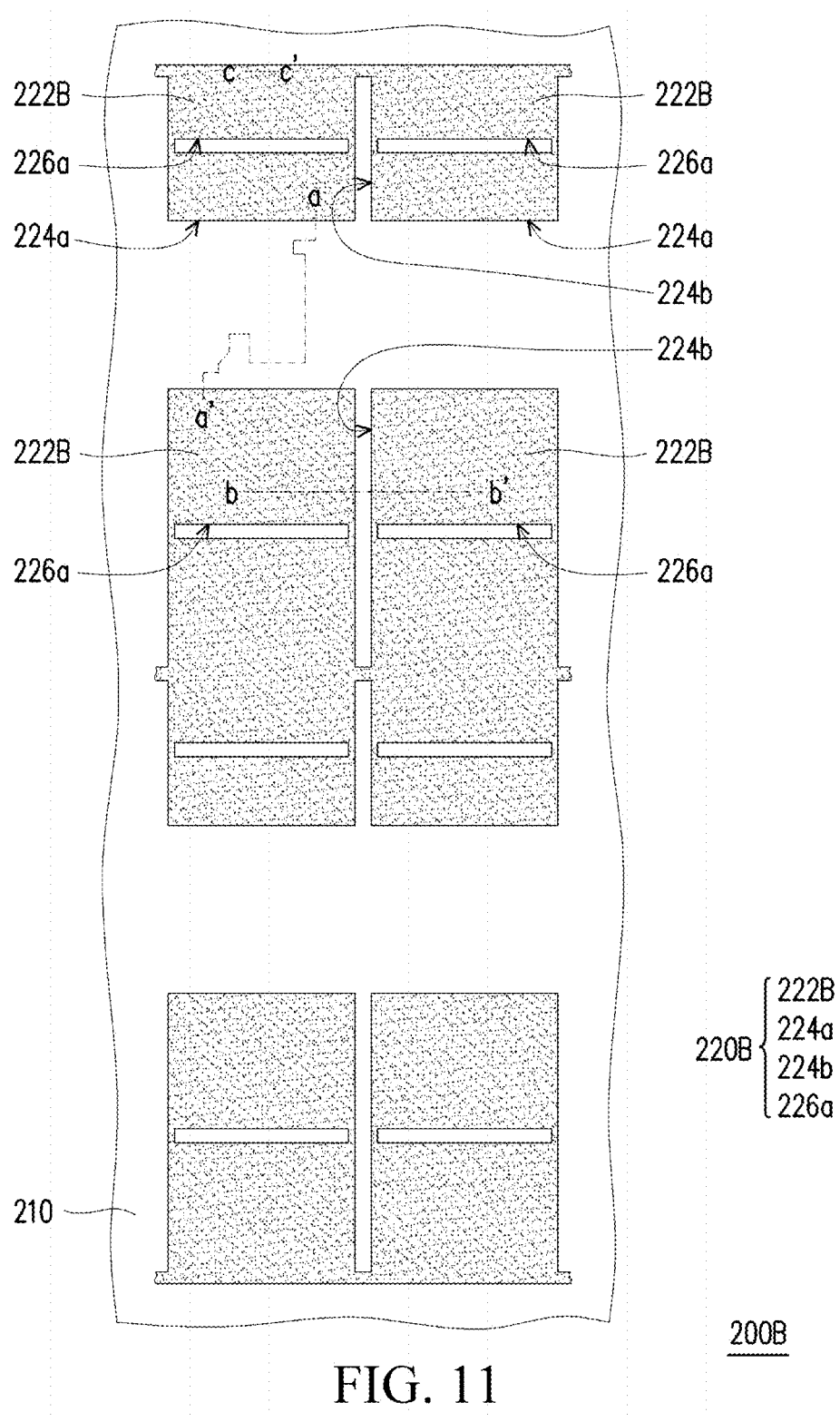
FIG. 11 is a top schematic diagram of an opposite substrate 200B of the display panel 1000B of FIG. 10.

Referring to FIG. 10, the display panel 1000B includes a pixel array substrate 100, an opposite substrate 200B disposed opposite to the pixel array substrate 100 and a liquid crystal layer 300. The liquid crystal layer 300 is sandwiched between pixel electrodes 132 and 134 of the pixel array substrate 100 and a common electrode 220B of the opposite substrate 200B. FIG. 11 is a top schematic diagram of an opposite substrate 200B of the display panel 1000B of FIG. 10. In particular, FIG. 10 corresponds to profiles a-a', b-b' and c-c' of FIG. 11. Referring to FIG. 10 and FIG. 11, the opposite substrate 200B includes a second substrate 210 and a common electrode 220B. The second substrate 210 is disposed opposite to the first substrate 110. The common electrode 220B is disposed on the second substrate 210 and located between the second substrate 210 and the liquid crystal layer 300. The common electrode 220B has common electrode patterns 222B electrically connected with each other and main slits 224a and 224b that define the common electrode patterns 222B. The main slits 224a and 224b are disposed correspondingly to the light shielding pattern 142.

The common electrode patterns 222B of the display panel 1000B is different from the common electrode patterns 222 of the display panel 1000. In detail, the common electrode patterns 222B have a minor slit 226a exposing the trunk portion 130a and cover the trunk portion 130b, the branch portions 130c and the alignment slit 130d, unlike the common electrode patterns 222 which cover the whole pixel electrodes 132 and 134. In this embodiment, the trunk portion 130a and the minor slit 226a of the pixel electrode 132 (and 134) may be selectively disposed along the extending direction x of the scan lines SL and at least partially overlap in a vertical projection direction z, but the present invention is not limited thereto.

Figure 12:
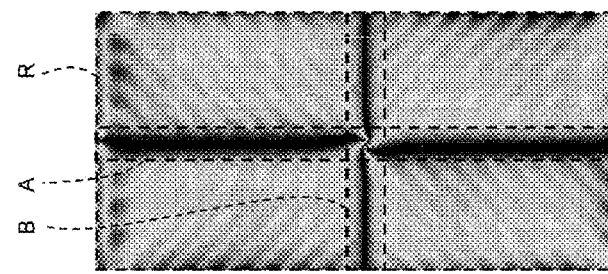
FIG. 12 shows an image corresponding to the region R of FIG. 2 when the display panel 1000B is enabled.

Through the setting of the minor slit 226a, the penetration rate of the display panel 1000B may be further enhanced compared with the display panel 1000, for example, is enhanced 2.55%, which is proved below through FIG. 8 and FIG. 12 (drawn on the last page of the figures). FIG. 12 shows an image corresponding to the region R of FIG. 2 when the display panel 1000B is enabled. It can be known by comparing FIG. 8 and FIG. 12 that, in the same area B corresponding to the trunk portion 130a of FIG. 2, the area B of FIG. 12 is more likely to be an illuminated state. The reason is that, in the embodiment of FIG. 8, a common electrode pattern 222 is present directly above the trunk portion 130a; therefore, when the display panel 1000 is enabled (.i.e., when the pixel electrode 132 or 134 and the common electrode pattern 222 have a drive voltage therebetween), an optical axis of the liquid crystal molecules 310 directly above the trunk portion 130a may substantially dump towards left and right sides of the centerline of the trunk portion 130a, but the dumping direction is not consistent with the extending direction of the alignment slit 130d of the pixel electrode 132 or 134, and regions directly above the corresponding trunk portion 130a are almost in a dark state; on the other hand, in the embodiment of FIG. 12, a first minor slit 226a is disposed directly above the trunk portion 130a (i.e., at least some regions directly above the trunk portion 130a are not provided with common electrode patterns 222); therefore, when the display panel 1000B is enabled (i.e., when the pixel electrode 132 or 134 and the common electrode pattern 222B have a drive voltage therebetween), an optical axis of the liquid crystal molecules 310 directly above the trunk portion 130a may substantially dump towards left and right sides of the centerline of the trunk portion 130a, and the dumping direction of the optical axis of most liquid crystal molecules 310 is consistent with the extending direction of the alignment slit 130d of the pixel electrode 132 or 134, making some regions directly above the trunk portion 130a in an illuminated state, to enhance the penetration rate of the display panel 1000B.

Figure 13:
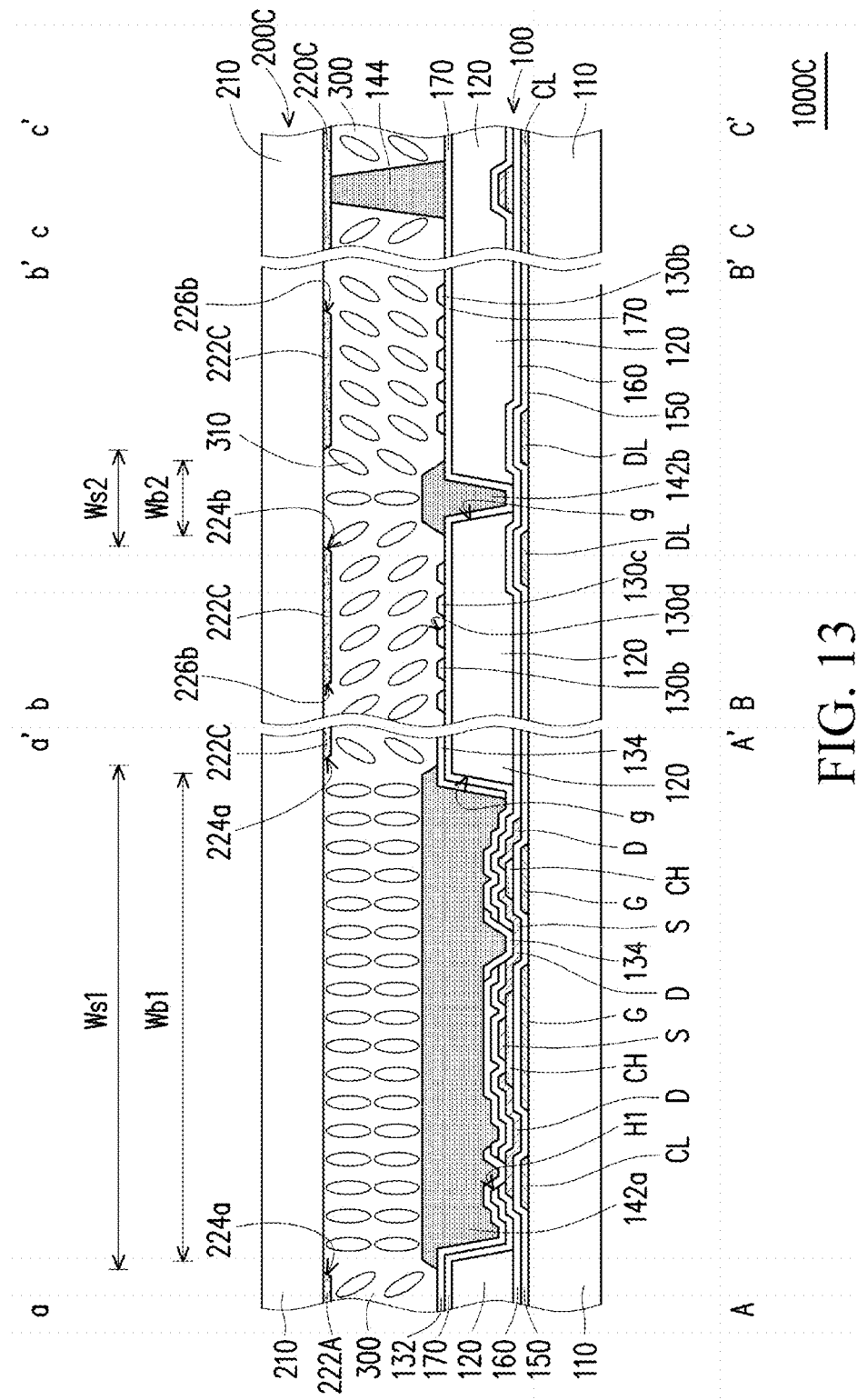
FIG. 13 is a schematic sectional diagram of another display panel 1000C according to an embodiment of the present invention.

FIG. 13 is a schematic sectional diagram of another display panel 10000 according to an embodiment of the present invention. The pixel array substrate 100 of the display panel 10000 is the same as the pixel array substrate 100 of the display panel 1000; therefore, reference can be made to the related description about FIG. 2, FIG. 3 and FIG. 4 for the description about the pixel array substrate 100 of the display panel 1000C, which are not repeated herein. The display panel 1000C is similar to the display panel 1000, and thus the same or corresponding device is represented with the same or corresponding reference sign. The difference between the display panel 10000 and the display panel 1000 is that the common electrodes 220 of the opposite substrate 200 and 220C of the opposite substrate 200C are different. The difference is mainly described below, and reference can be made to the foregoing description for the similarity between them, which is not repeated herein.

Figure 14:
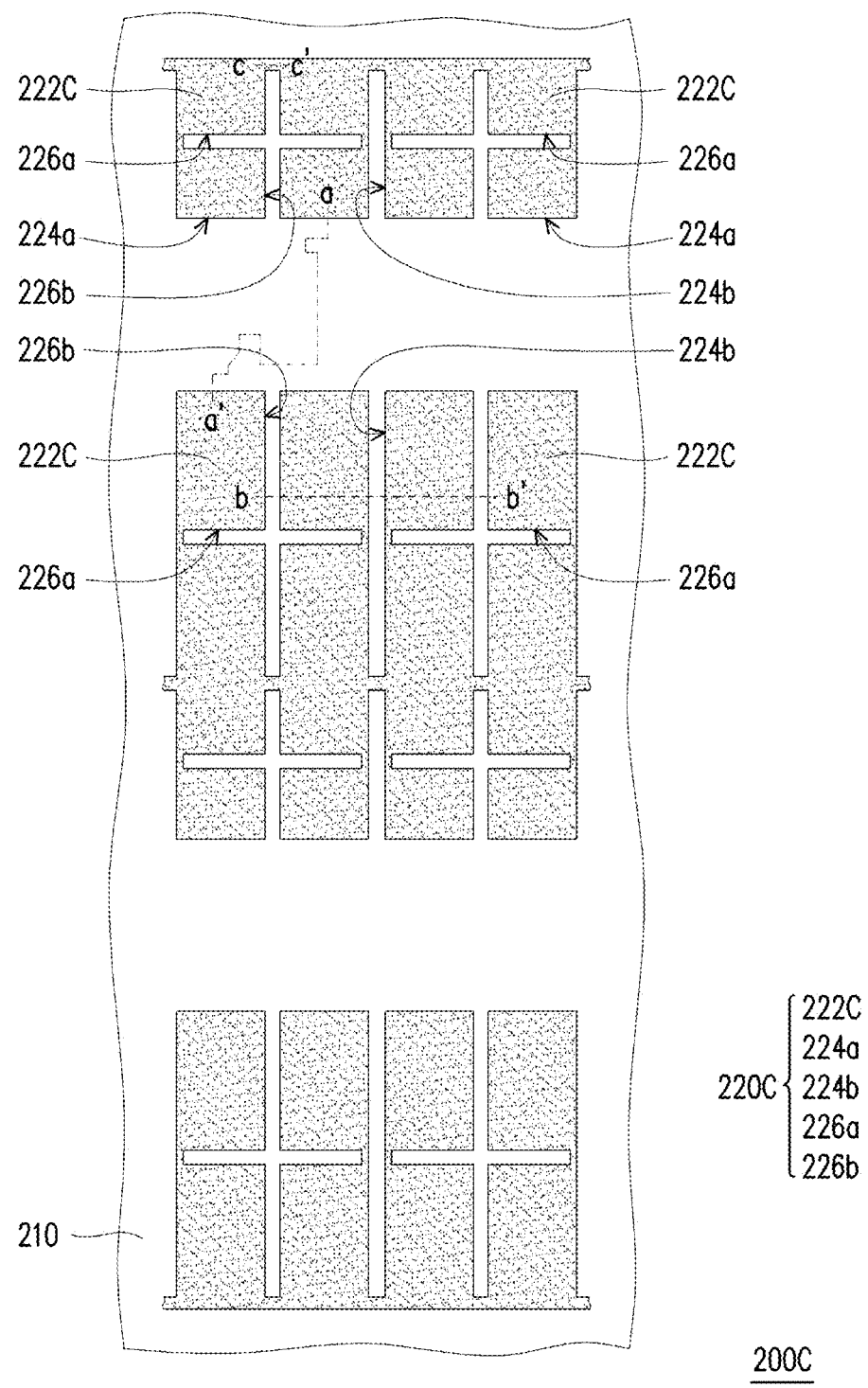
FIG. 14 is a top schematic diagram of an opposite substrate 200C of the display panel 1000C of FIG. 13.

Referring to FIG. 13, the display panel 1000C includes a pixel array substrate 100, an opposite substrate 200C disposed opposite to the pixel array substrate 100 and a liquid crystal layer 300. The liquid crystal layer 300 is sandwiched between pixel electrodes 132 and 134 of the pixel array substrate 100 and a common electrode 220C of the opposite substrate 200C. FIG. 14 is a top schematic diagram of an opposite substrate 200C of the display panel 1000C of FIG. 13. In particular, FIG. 13 corresponds to profiles a-a', b-b' and c-c' of FIG. 14, Referring to FIG. 13 and FIG. 14, the opposite substrate 200C includes a second substrate 210 and a common electrode 220C. The second substrate 210 is disposed opposite to the first substrate 110. The common electrode 220C is disposed on the second substrate 210 and located between the second substrate 210 and the liquid crystal layer 300. The common electrode 220C has common electrode patterns 222C electrically connected with each other and main slits 224a and 224b that define the common electrode patterns 222C. The main slits 224a and 224b are disposed correspondingly to the light shielding pattern 142.

Figure 15:
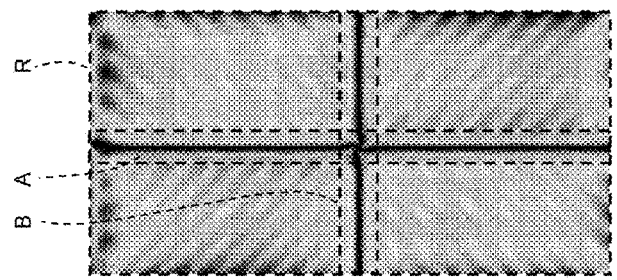
FIG. 15 shows an image corresponding to the region R of FIG. 2 when the display panel 10000 is enabled.

The common electrode patterns 222C of the display panel 1000B is different from the common electrode patterns 222 of the display panel 1000. In detail, the common electrode patterns 222C have minor slits 226a and 226b exposing the trunk portions 130a and 130b and the common electrode patterns 222C cover the branch portions 130c and the alignment slit 130d. Reference can be made to the foregoing description for the minor slits 222a and 222b, which are not repeated herein. Likewise, through the setting of the minor slits 226a and 226b, the penetration rate of the display panel 1000C may be further enhanced compared with the display panel 1000, for example, is enhanced 10.81%, which is proved below through FIG. 8 and FIG. 15 (drawn on the last page of the figures). FIG. 15 shows an image corresponding to the region R of FIG. 2 when the display panel 10000 is enabled. It can be known by comparing FIG. 8 and FIG. 15 that, in the same areas A and B corresponding to the trunk portions 130a and 130b of FIG. 2, the areas A and B of FIG. 15 are more likely to be an illuminated state. In other words, FIG. 15 demonstrates that the penetration rate of the display panel 10000 indeed can be more enhanced than the display panel 1000.

Figure 16:
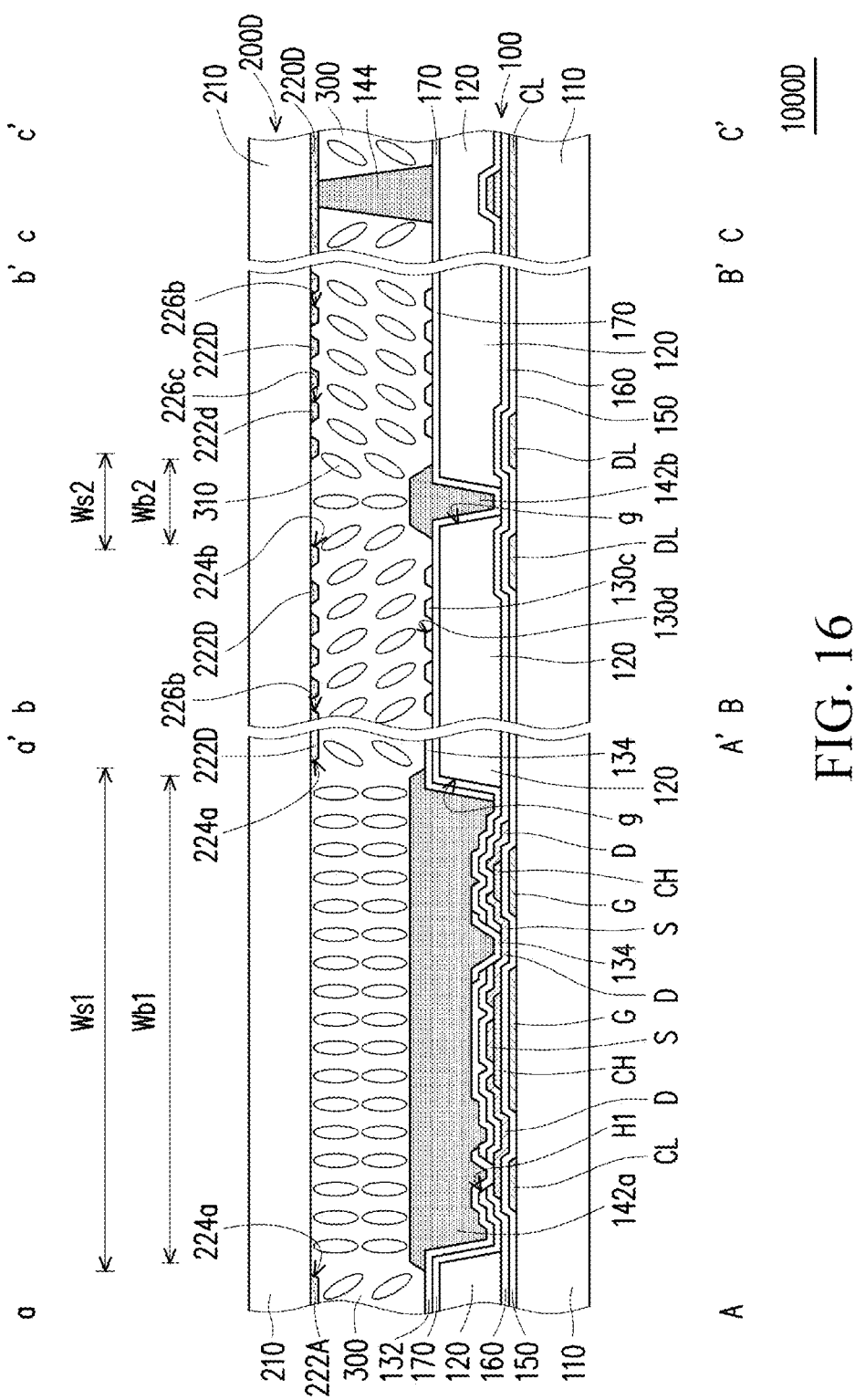
FIG. 16 is a schematic sectional diagram of another display panel 1000D according to an embodiment of the present invention.

FIG. 16 is a schematic sectional diagram of a display panel 1000D according to an embodiment of the present invention. The pixel array substrate 100 of the display panel 1000D is the same as the pixel array substrate 100 of the display panel 1000; therefore, reference can be made to the related description about FIG. 2, FIG. 3 and FIG. 4 for the description about the pixel array substrate 100 of the display panel 1000D, which are not repeated herein. The display panel 1000D is similar to the display panel 1000, and thus the same or corresponding device is represented with the same or corresponding reference sign. The difference between the display panel 1000D and the display panel 1000 is that the common electrodes 220 of the opposite substrate 200 and 220D of the opposite substrate 200D are different. The difference is mainly described below, and reference can be made to the foregoing description for the similarity between them, which is not repeated herein.

Figure 17:
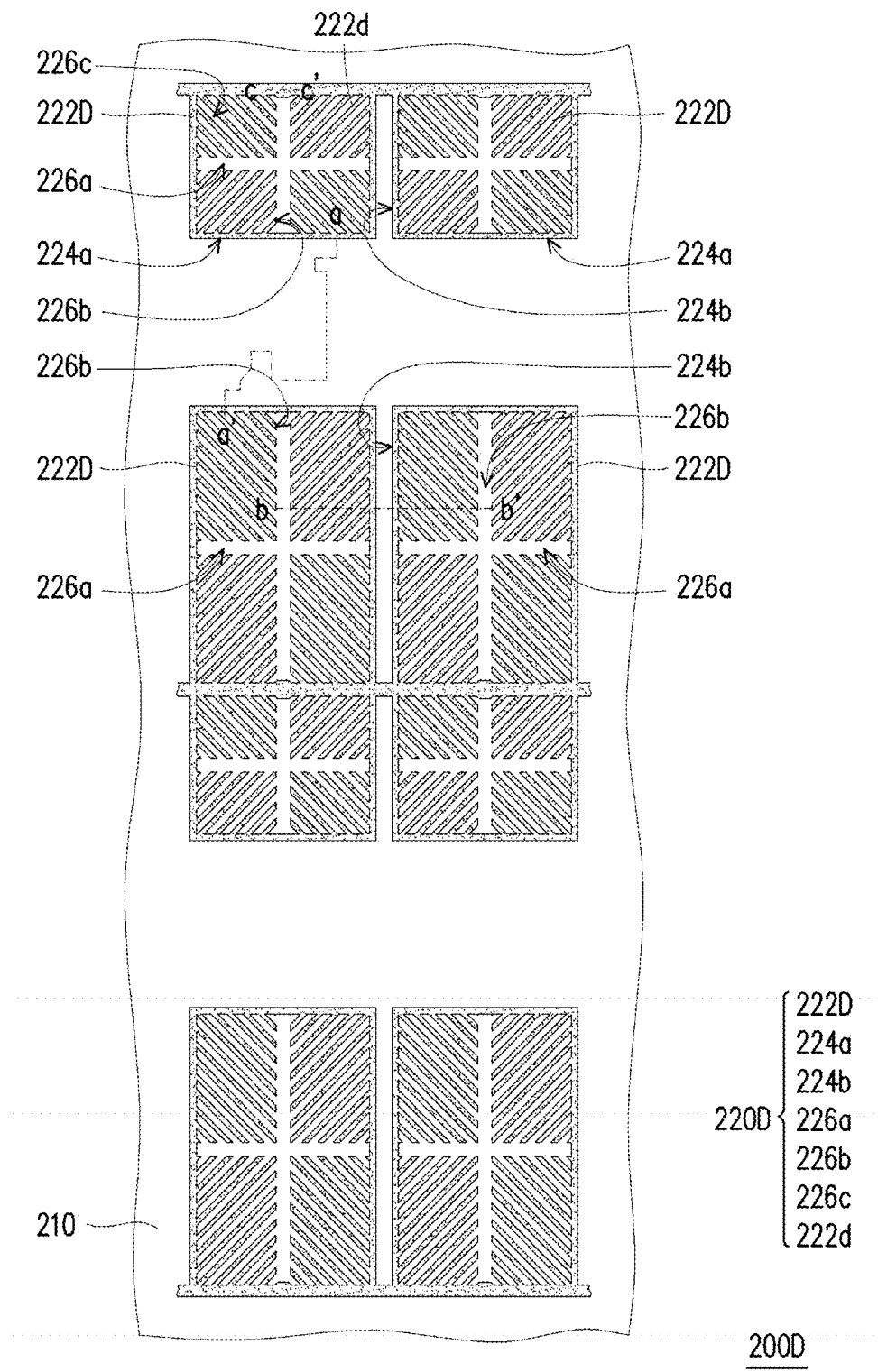
FIG. 17 is a top schematic diagram of an opposite substrate 200C of the display panel 1000D of FIG. 16.

Referring to FIG. 16, the display panel 1000D includes a pixel array substrate 100, an opposite substrate 200D disposed opposite to the pixel array substrate 100 and a liquid crystal layer 300. The liquid crystal layer 300 is sandwiched between pixel electrodes 132 and 134 of the pixel array substrate 100 and a common electrode 220D of the opposite substrate 200D. FIG. 17 is a top schematic diagram of an opposite substrate 200C of the display panel 1000D of FIG. 16. In particular, FIG. 16 corresponds to profiles a-a', b-b' and c-c' of FIG. 17. Referring to FIG. 16 and FIG. 17, the opposite substrate 200D includes a second substrate 210 and a common electrode 220D. The second substrate 210 is disposed opposite to the first substrate 110. The common electrode 220D is disposed on the second substrate 210 and located between the second substrate 210 and the liquid crystal layer 300. The common electrode 220D has common electrode patterns 222D electrically connected with each other and main slits 224a and 224b that define the common electrode patterns 222D. The main slits 224a and 224b are disposed correspondingly to the light shielding pattern 142.

The common electrode patterns 222D of the display panel 1000D are different from the common electrode patterns 222 of the display panel 1000. In detail, the common electrode patterns 222D have minor slits 226a and 226b exposing the trunk portions 130a and 130b. Reference can be made to the foregoing description for the minor slits 226a and 226b, which are not repeated herein. In addition, the common electrode patterns 222D further have a minor slit 226c that exposes branch portions 130c. In other words, the common electrode patterns 222D have branch portions 222d that define the minor slit 226c; as shown in FIG. 16, vertical projections of the branch portions 222d of the common electrode patterns 222D on the first substrate 110 and vertical projections of the branch portions 130c of the pixel electrodes 132 (or 134) on the first substrate 110 are arranged alternatively. Through the setting of the minor slit 226c exposing the branch portions 130c, an optical axis of some liquid crystal molecules 310 directly above the branch portions 130c of the pixel electrodes 132 and 134 will dump towards two sides of the centerline of the branch portions 130c. At this point, the area directly above the branch portions 130c will be more likely to be in an illuminated state, so that the penetration rate of the display panel 1000D can be further enhanced than the display panel 1000C.

In summary, a display panel according to an embodiment of the present invention includes a pixel array substrate, an opposite substrate disposed opposite to the pixel array substrate and a liquid crystal layer located between the pixel array substrate and the opposite substrate. The pixel array substrate is a structure of COA and BOA having a color filter pattern and a light shielding pattern. In particular, the common electrode of the opposite substrate has a main slit disposed correspondingly to the light shielding pattern of the pixel array substrate. Through the setting of the main slit, at least some regions directly above the light shielding pattern have no common electrode. Accordingly, when the display panel is enabled (that is, when the pixel electrode and the common electrode have a drive voltage therebetween), liquid crystal molecules directly above and near the light shielding pattern are prone to dumping along a specified direction, and it is not easy to cause a disclination line problem, so that the penetration rate of the display panel can be enhanced.

In addition, although the figures of the present application are illustrated with an unbent display panel, the design that the common electrode of the present invention has a main slit disposed correspondingly to the light shielding pattern of the pixel array substrate may also be applied to a curved display, and the curved display using the design also falls within the protection scope of the present invention.

Although the present invention has been disclosed as above with embodiments, the embodiments are not used to define the present invention; any person of ordinary skill in the art can make some variations and modifications without departing from the spirit and scope of the present invention, and thus the protection scope of the present invention should be subject to the scope defined by the appended claims.

What is claimed is:

1. A display panel, comprising:
   a first substrate;
   a plurality of scan lines and a plurality of data lines disposed on the first substrate, wherein the scan lines and the data lines are crossed to define pixel areas on the first substrate;
   a plurality of active devices located on the first substrate and electrically connected with the scan lines and the data lines;
   a plurality of color filter patterns disposed on the pixel areas and separated from each other;
   a plurality of pixel electrodes disposed on the color filter patterns and electrically connected with the active devices;
   a light shielding pattern located between two adjacent color filter patterns to shield a gap between the two adjacent color filter patterns;
   a second substrate disposed opposite to the first substrate;
   a liquid crystal layer disposed between the second substrate and the pixel electrodes; and
   a common electrode disposed on the second substrate and located between the second substrate and the liquid crystal layer, wherein the common electrode has common electrode patterns and a main slit, the common electrode patterns are disposed correspondingly to the pixel electrodes, and the main slit is disposed correspondingly to the light shielding pattern, wherein the light shielding pattern comprises:
   a plurality of first light shielding portions disposed on the scan lines; and
   a plurality of second light shielding portions intersecting with the first light shielding portions, and disposed along an extending direction of the data lines; and
   the main slit of the common electrode comprises:
   a plurality of first main slits disposed correspondingly to the first light shielding portions, wherein the first main slits and the first light shielding portions at least partially overlap in a vertical projection direction; and
   a plurality of second main slits intersecting with the first main slits and disposed correspondingly to the second light shielding portions, wherein the second main slits and the second light shielding portions at least partially overlap in a vertical projection direction.

2. The display panel according to claim 1, wherein the width of the main slit is greater than or equal to that of the light shielding pattern.

3. The display panel according to claim 1, wherein the light shielding pattern surrounds the pixel electrodes.

4. The display panel according to claim 1, wherein
each of the first main slits has a width Ws1 in the extending direction of the data lines, a first light shielding portion corresponding to the first main slit has a width Wb1 in the extending direction of the data lines, and Ws1≥Wb1; and
each of the second main slits has a width Ws2 in an extending direction of the scan lines, a second light shielding portion corresponding to the second main slit has a width Wb2 in the extending direction of the scan lines, and Ws2≥Wb2.

5. The display panel according to claim 1, wherein each of the pixel electrodes comprises:
a trunk portion dividing the pixel area where it is into regions; and
a plurality of branch portions electrically connected with the trunk portion and located within the regions, wherein
each of the common electrode patterns has a first minor slit, the first minor slit disposed correspondingly to the trunk portion.

6. The display panel according to claim 5, wherein the trunk portion of the pixel electrode and the first minor slit are disposed along an extending direction of the data lines and at least partially overlap in a vertical projection direction.

7. The display panel according to claim 5, wherein the trunk portion of the pixel electrode and the first minor slit are disposed along an extending direction of the scan lines and at least partially overlap in a vertical projection direction.

8. The display panel according to claim 5, wherein the trunk portion of the pixel electrode comprises:
a first trunk portion parallel to the scan lines; and
a second trunk portion electrically connected with the first trunk portion and parallel to the data lines, wherein the common electrode pattern covers the branch portions, and the first minor slit uncover the first trunk portion and the second trunk portion corresponding thereto.

9. The display panel according to claim 5, wherein each of the common electrode patterns has second minor slits, and the second minor slits disposed correspondingly to the branch portions.

10. The display panel according to claim 1, further comprising:
a plurality of spacers disposed on the first substrate and abutting against the second substrate, wherein the spacers and the light shielding pattern are made of the same material.

11. The display panel according to claim 1, wherein the pixel electrodes comprise a first pixel electrode and a second pixel electrode adjacent to each other, the active devices comprise a first active device electrically connected with the first pixel electrode and a second active device electrically connected with the second pixel electrode, and the display panel further comprises:
a shared switch device;
a first common electrode line, wherein the first pixel electrode overlaps with the first common electrode line to be electrically coupled into a first storage capacitor; and
a second common electrode line, wherein the second common electrode line overlaps with the second common electrode line to be electrically coupled into a second storage capacitor;
wherein the second active device has a source electrically connected with one of the data lines, a gate electrically connected with one of the scan lines, and a drain electrically connected with the second pixel electrode; the shared switch device has a source, a gate electrically connected with another scan line and a drain, wherein the source of the shared switch device is electrically connected with the drain of the second active device, and the drain of the shared switch device overlaps with the first common electrode line, to be electrically coupled into a shared capacitor.

12. The display panel according to claim 1, further comprising:
a first insulating layer covering the scan lines, the data lines and the active devices, wherein the color filter patterns are disposed on the first insulating layer.

13. The display panel according to claim 1, further comprising:
a second insulating layer covering the color filter patterns, wherein the pixel electrodes and the light shielding pattern are disposed on the second insulating layer.

14. A display panel, comprising:
a first substrate;
a plurality of scan lines and a plurality of data lines disposed on the first substrate, wherein the scan lines and the data lines are crossed to define pixel areas on the first substrate;
a plurality of active devices located on the first substrate and electrically connected with the scan lines and the data lines;
a plurality of color filter patterns disposed on the pixel areas and separated from each other;
a plurality of pixel electrodes disposed on the color filter patterns and electrically connected with the active devices, wherein each of the pixel electrodes comprises:
a trunk portion dividing the pixel area where it is into regions; and
a plurality of branch portions electrically connected with the trunk portion and located within the regions;
a light shielding pattern located between two adjacent color filter patterns to shield a gap between the two adjacent color filter patterns;
a second substrate disposed opposite to the first substrate;
a liquid crystal layer disposed between the second substrate and the pixel electrodes; and
a common electrode disposed on the second substrate and located between the second substrate and the liquid crystal layer, wherein the common electrode has common electrode patterns and a main slit, the common electrode patterns are disposed correspondingly to the pixel electrodes, and the main slit is disposed correspondingly to the light shielding pattern, wherein each of the common electrode patterns has a first minor slit disposed correspondingly to the trunk portion, and has second minor slits disposed correspondingly to the branch portions.

15. A display panel, comprising:
a first substrate;
a plurality of scan lines and a plurality of data lines disposed on the first substrate, wherein the scan lines and the data lines are crossed to define pixel areas on the first substrate;

a plurality of active devices located on the first substrate and electrically connected with the scan lines and the data lines;

a plurality of color filter patterns disposed on the pixel areas and separated from each other;

a plurality of pixel electrodes disposed on the color filter patterns and electrically connected with the active devices;

a light shielding pattern located between two adjacent color filter patterns to shield a gap between the two adjacent color filter patterns;

a second substrate disposed opposite to the first substrate;

a liquid crystal layer disposed between the second substrate and the pixel electrodes; and a common electrode disposed on the second substrate and located between the second substrate and the liquid crystal layer, wherein the common electrode has common electrode patterns and a main slit, the common electrode patterns are disposed correspondingly to the pixel electrodes, and the main slit is disposed correspondingly to the light shielding pattern, wherein the pixel electrodes comprise a first pixel electrode and a second pixel electrode adjacent to each other, the active devices comprise a first active device electrically connected with the first pixel electrode and a second active device electrically connected with the second pixel electrode, and the display panel further comprises:

a shared switch device;

a first common electrode line, wherein the first pixel electrode overlaps with the first common electrode line to be electrically coupled into a first storage capacitor; and a second common electrode line, wherein the second common electrode line overlaps with the second common electrode line to be electrically coupled into a second storage capacitor;

wherein the second active device has a source electrically connected with one of the data lines, a gate electrically connected with one of the scan lines, and a drain electrically connected with the second pixel electrode; the shared switch device has a source, a gate electrically connected with another scan line and a drain, wherein the source of the shared switch device is electrically connected with the drain of the second active device, and the drain of the shared switch device overlaps with the first common electrode line, to be electrically coupled into a shared capacitor.

* * * * *